United States Patent [19]

Kikuchi et al.

[11] 4,212,622

[45] Jul. 15, 1980

[54] PRODUCT TAKE OUT DEVICES FOR USE IN MOLDING MACHINES

[75] Inventors: Tsuyoshi Kikuchi, Atsugi; Kiyoshi Takusagawa, Zama, both of Japan

[73] Assignee: Toshiba Kikai Kabushiki Kaisha, Tokyo, Japan

[21] Appl. No.: 36,793

[22] Filed: May 7, 1979

[30] Foreign Application Priority Data

May 9, 1978 [JP] Japan .................................. 53/54790

[51] Int. Cl.² ............................................. B29C 7/00
[52] U.S. Cl. ................................... 425/444; 425/556
[58] Field of Search .............. 425/38, 436, 444, 556, 425/32, 501, 437

[56] References Cited

U.S. PATENT DOCUMENTS

| | | | |
|---|---|---|---|
| 2,485,336 | 10/1949 | Valyi | 425/444 |
| 3,081,486 | 3/1963 | Skvorc | 425/556 X |
| 3,131,243 | 4/1964 | Fannen | 425/436 X |
| 3,514,813 | 6/1970 | Westermann | 425/501 |
| 3,525,382 | 8/1970 | Devol | 425/437 X |
| 3,530,533 | 9/1970 | Turk et al. | 425/32 |
| 3,702,749 | 11/1972 | Flusfeder et al. | 425/436 X |
| 3,767,352 | 10/1973 | Rees | 425/444 X |
| 4,005,965 | 2/1977 | Roczynski et al. | 425/556 X |
| 4,124,352 | 11/1978 | Pasch | 425/556 |

Primary Examiner—J. Howard Flint, Jr.
Attorney, Agent, or Firm—Koda and Androlia

[57] ABSTRACT

In a device for taking out a molded product from a mold of a molding machine by means of a chuck, a parallelogram is used. One pin of the parallelogram is used as a stationary point and the chuck is connected to a pin diagonally opposite the stationary point. A drive shaft is provided for one arm of the parallelogram for swinging the same about the stationary point. A cam groove is provided to control the locus of movement of the drive shaft.

4 Claims, 4 Drawing Figures

FIG. I

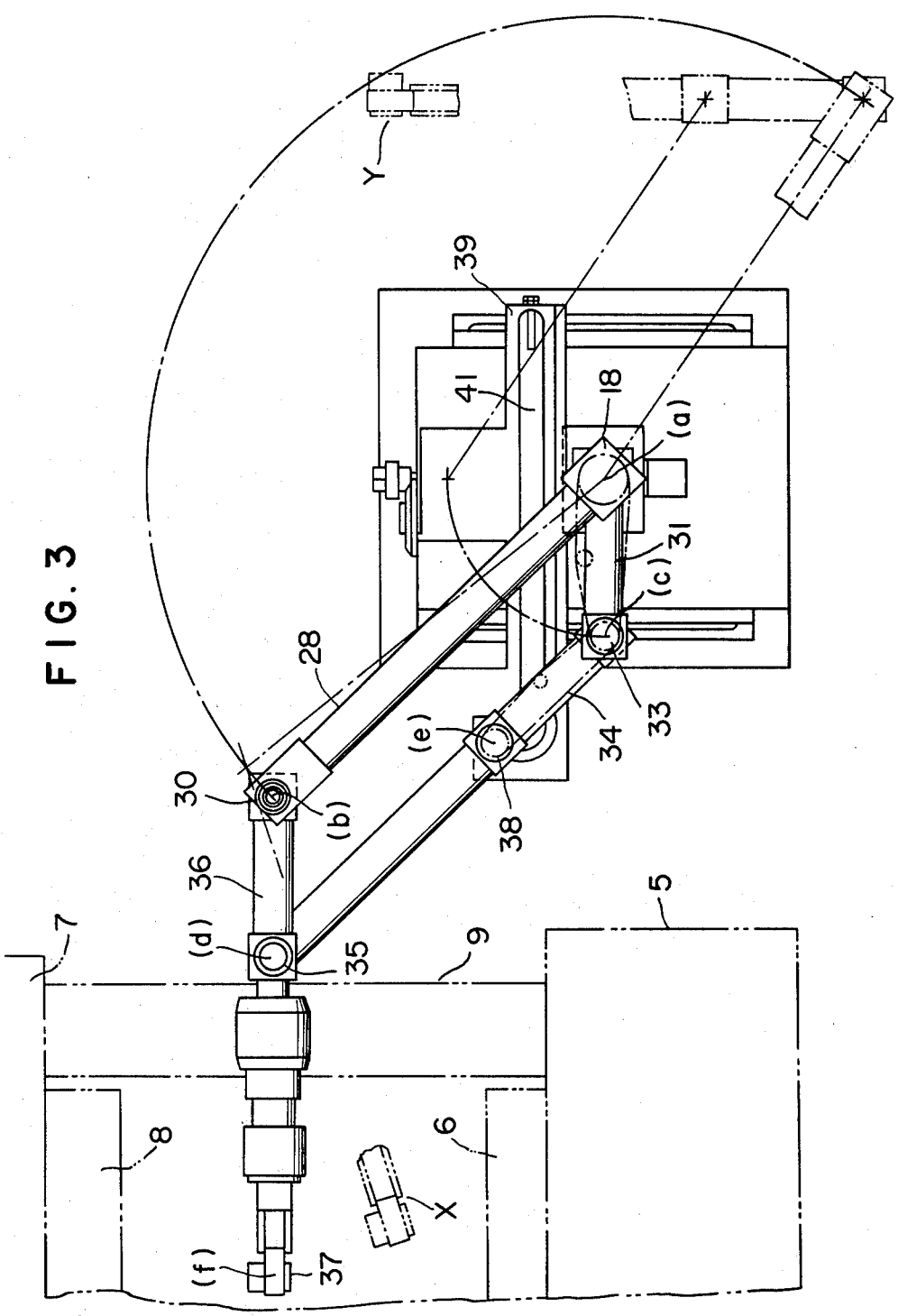

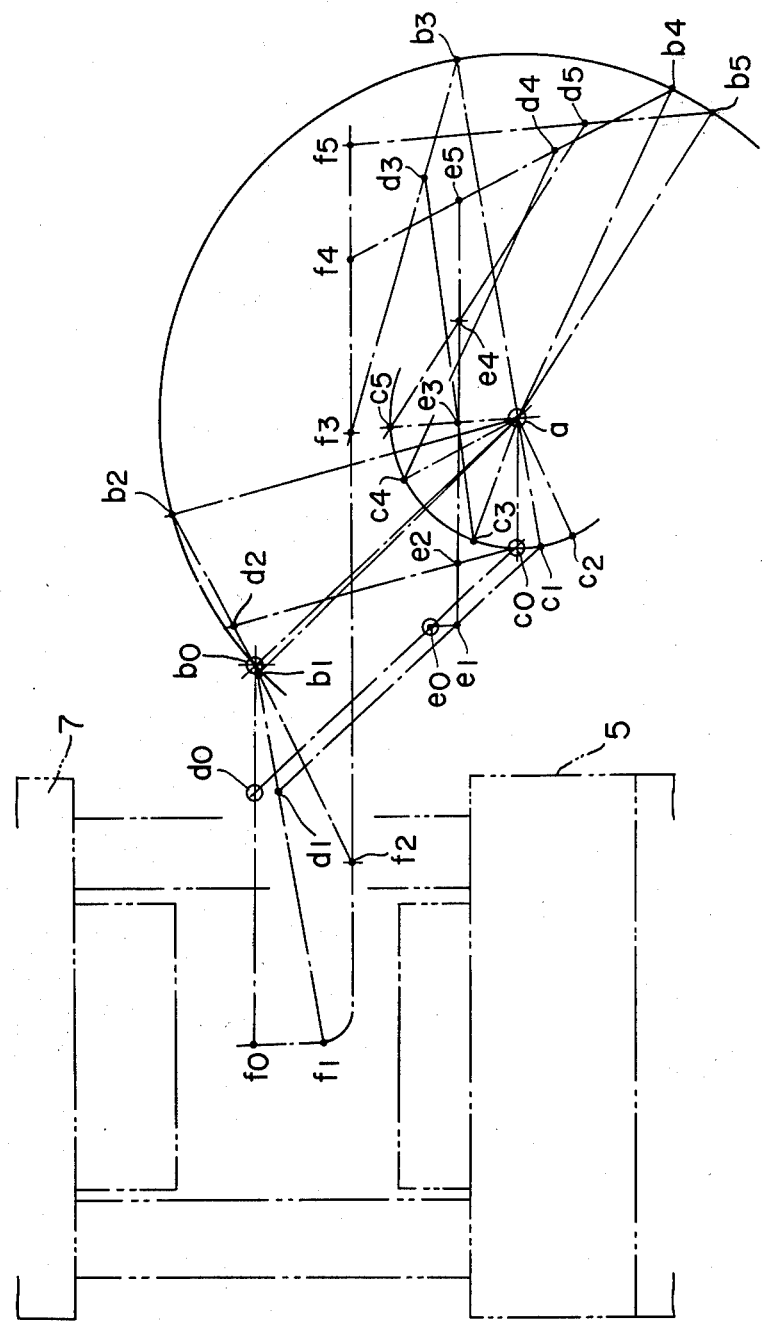

PRODUCT TAKE OUT DEVICES FOR USE IN MOLDING MACHINES

BACKGROUND OF THE INVENTION

This invention relates to a product take out device for use in such molding machines as a die cast machine, an injection molding machine or the like.

A prior art product take out device for use in a molding machine comprises a plurality of driving piston cylinder assemblies for moving a product chuck which grasps a product molded by a molding machine to the surface of a metal mold, for grasping the product with the chuck, for removing the product from the push out pins of the metal mold, for carrying the product to the outside of the molding machine from the surface of the metal mold, and for swinging the taken out product to a conveyor, such operations being made by a combination of linear and swinging or rotary motions.

Since above described operations are made within the strokes of respective piston cylinder assemblies the length of the product take out device becomes very long so that in certain cases it is impossible to install such take out device because of a limitation of an available space. Moreover, as the operating speed of the piston cylinder assemblies is increased the product grasping chuck tends to vibrate thus rendering it impossible to accurately position the same.

Moreover, since piston cylinder assemblies are used as drive sources of the product take out device it is necessary to use means for decelerating pistons at the ends of their strokes thus complicating the mechanism.

SUMMARY OF THE INVENTION

It is an object of this invention to provide an improved product take out device for use in a molding machine that can operate continuously at a high speed.

Another object of this invention is to provide a product take out device for use in a molding machine which is compact and can take out the product to any desired position.

According to this invention there is provided a product take out device for use in a molding machine, comprising a four arm link mechanism including four arms which are connected together by four pins, one of which is used as a stationary point of the link mechanism, a chuck operatively connected to one of the pins used as a stationary pin for grasping and taking out a product from a mold of the molding machine, a drive shaft provided for one of the arms, means for driving the drive shaft thereby swinging the four arm link mechanism about the stationary point, and guide means for controlling the locus of movement of the drive shaft.

BRIEF DESCRIPTION OF THE DRAWINGS

In the accompanying drawings:

FIG. 3 is a front view of the embodiment shown in FIG. 1; and

FIG. 4 is a diagram showing the locus of movement of the link mechanism utilized in this invention.

DESCRIPTION OF THE PREFERRED EMBODIMENT

Figure 1:
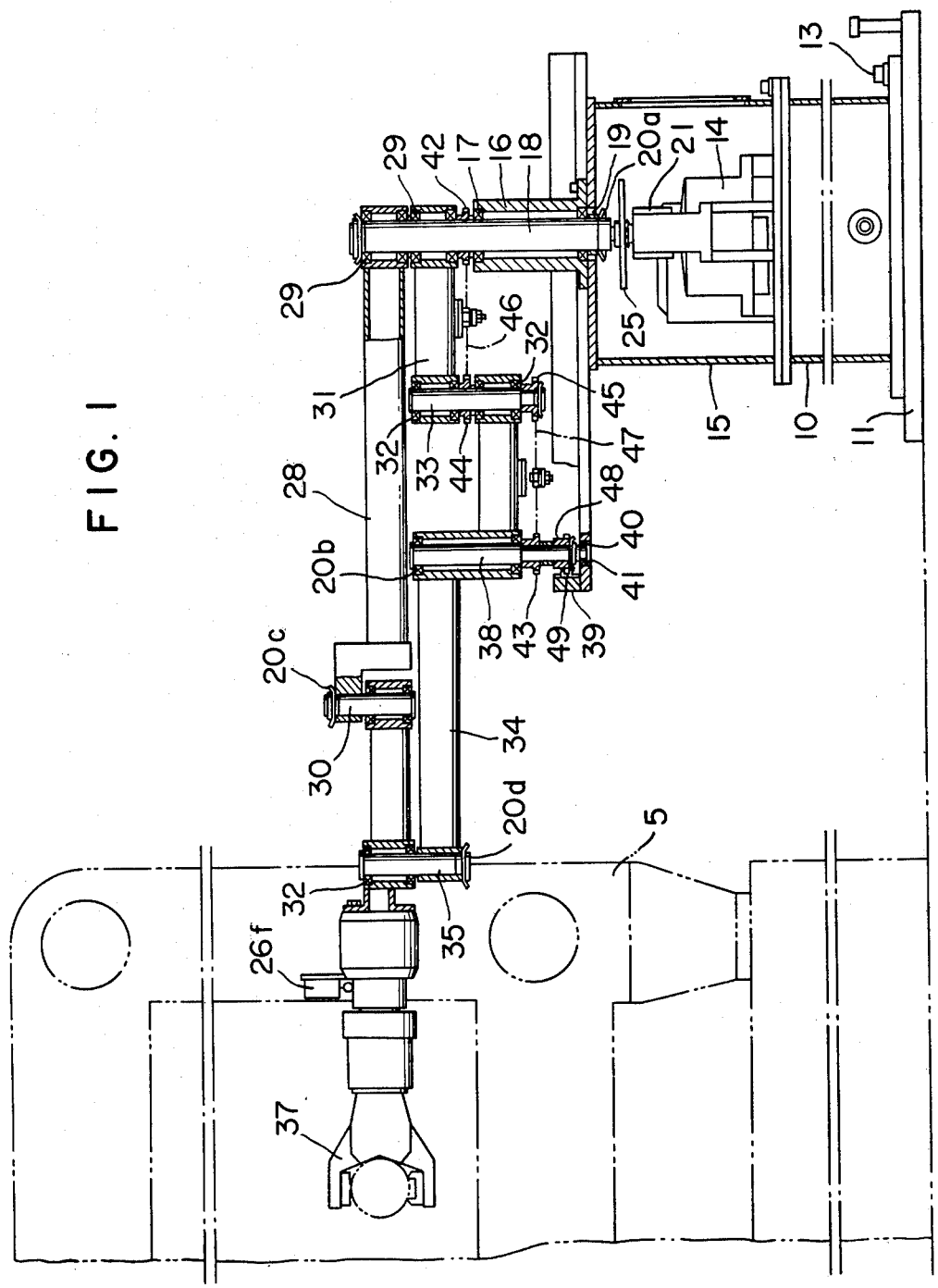
FIG. 1 is a front view, partly in section, showing one embodiment of the product take out device according to this invention.
Figure 2:
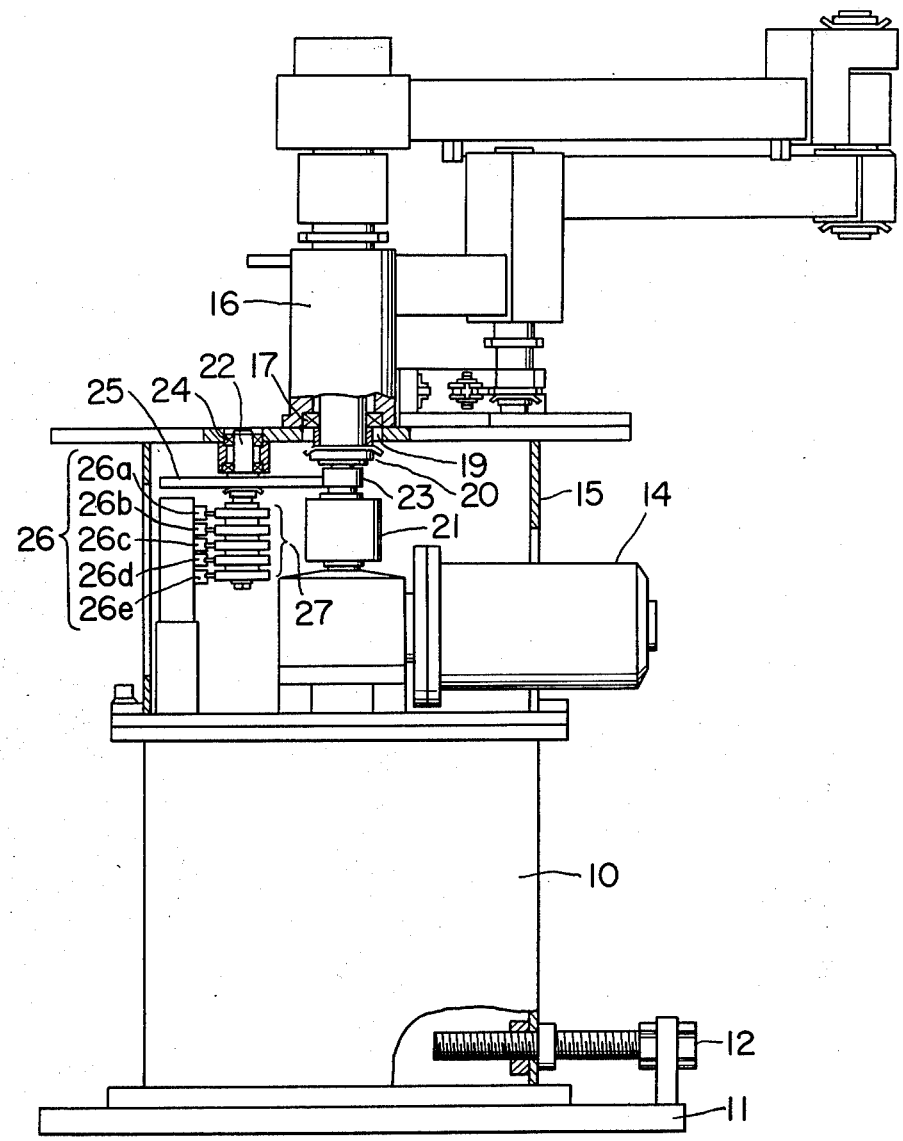
FIG. 2 is a plan view, partly in section, of the embodiment shown in FIG. 1.

In the accompanying drawings, a molding machine to which the product take out device of this invention is applicable comprises a stationary die plate 5 supporting a stationary metal mold 6 and a movable die plate 7 carrying a movable metal mold 8.

A product take out device embodying the invention comprises a box like pedestal 10 located on one side of the die plate 5 and moved toward and away therefrom along the upper surface of a sole plate 11 by an adjusting bolt 12 in accordance with the configuration of the product molded by the molding machine. After adjustment, the pedestal 10 is secured to the adjusted position by a bolt 13. A reduction gear box 15 is mounted on the pedestal 10, and a motor 14 provided with a reduction gearing, not shown, is contained in the gear box 15 and its output shaft is connected through a coupling 21 to a first pin 18 which is rotatably supported by a pin guide 16 via a bearing 17, a spacer 19 and a bearing nut 20a, the pin guide 16 being secured to the upper end of the reduction gear box 15.

A limit switch operating shaft 22 is rotatably supported by the reduction gear box 15 through a bearing 24 and is driven by a pinion 23 secured to the first pin 18 and a large diameter gear 25 secured to the shaft 22. A plurality of dogs 27 are adjustably mounted on the limit switch operating shaft 22 to actuate a plurality of limit switches 26 contained in the reduction gear box 15. The limit switches 26 and divided into an insertion limit switch 26a and a take out limit switch 26b which produce instruction signals at an insertion limit (advance limit) position when a chuck 37 to be described later is advanced between two metal molds 6 and 8 and at a take out limit (retract limit) when the chuck is retracted from between the metal molds; advance deceleration and retract deceleration limit switches 26c and 26d which produce deceleration signals a little time before the insertion limit and the take out limit respectively; a pull out limit switch 26e which produces an instruction signal for decreasing the output of the motor 14 when the molded product in the metal molds is grasped and separated from the push out pins, not shown, by the chuck 37; and a return limit switch 26f (see FIG. 1) which confirms the fact that the chuck has been brought to an attitude capable of grasping the next product in the movable metal mold 8 after the chuck has taken out a preceding product to a predetermined position from between the metal molds 6 and 8 and then returns.

A first arm 28 is rotatably supported by the first pin 18 through a bearing 29 and a second pin 30 is secured to the free end of the first arm 28 through a knock pin, not shown, and a bearing nut 20b. A second arm 31 is rotatably mounted on the first pin 18 through a bearing 29 and a third pin 33 is rotatably mounted on the free end of arm 31 through a bearing 32. A third arm 34 which is parallel with and having the same length as the first arm 28 is provided, and the third pin 33 is rotatably supported by one end of the third arm 34 through a bearing 32. A fourth pin 35 is secured to the opposite end of the third arm 34 by a knock pin, not shown, and a bearing nut 20d. A fourth arm 36 which is parallel with and having the same length as the second arm 31 is provided with one end rotatably supported by the second pin 30 through a bearing 32 and the opposite end rotatably supported by the fourth pin 35 through a bearing 32. The chuck 37 for grasping a product is secured to that opposite end. A drive shaft 38 is rotatably supported by the third arm 34 through a bearing 20b and at the lower end of the drive shaft 38 is secured to a rotatable cam follower 40 adapted to slide along a groove 41 of a grooved cam plate 39 mounted on the reduction gear box 15. The grooved cam plate 39 defines a base line which determines a predetermined locus of movement of the chuck 37 between a position at which the check grasps and takes out the product from between the two metal molds 6 and 8 and a predetermined position outside the molding machine. A first sprocket wheel 42 is secured to the first pin 18, and a fourth sprocket wheel 43 is secured to the drive shaft 38 and these sprocket wheels are connected to second and third sprocket wheels 44 and 45 respectively through chains 46 and 47. A fifth sprocket wheel 48 is secured to the drive shaft 38 and driven by a chain 49 secured to the grooved cam plate 39 to extend along the groove 41 of the grooved cam plate 39 (see FIG. 3).

The product take out device described above operates as follows. When the motor 14 starts, the first pin 18 is rotated and at the same time the drive shaft 38 is also driven by the motor through the first sprocket wheel 42, chain 46, second and third sprocket wheels 44 and 45, chain 47 and fifth sprocket wheel 48. Since the cam follower 40 is arranged to move along the groove 41 of the grooved cam plate 39, the drive shaft 38 is moved along groove 41 while rotating as the fifth sprocket 48 is driven by chain 49. As a consequence, the first and second arms 28 and 31 rotate about the first pin 18 shown in FIG. 3 whereas the third and fourth arms 34 and 36 move along the loci indicated by dot and dash lines shown in FIG. 4.

In this embodiment, for the purpose of driving and moving the drive shaft 38, sprocket wheels and chains have been used to couple motor 14 and drive shaft 38 and to cause drive shaft 38 to engage the groove 41, but these coupling means can be substituted by suitable timing pulleys and timing belts. Further, it is possible to directly connect the drive shaft 38 to the motor 14 thereby eliminating various sprocket wheels and chains described above and timing pulleys and timing belts.

Thus the fifth sprocket wheel 48 secured to the drive shaft 38 may be substituted by a pinion, and chain 49 secured to the grooved cam plate 39 may be substituted by a rack. Furthermore, motor 14 with a reduction gearing for rotating the drive shaft 38 may be substituted by any drive means, for example an oil pressure motor or a piston cylinder assembly.

At start, the first through fourth arms 28 through 36 are at the take out limit (retract limit) shown by dot and dash lines in FIG. 3. At this time, the second pin 30, the third pin 33, the fourth pin 35, the chuck 37 and the drive shaft 38 are at positions $b_5$, $c_5$, $d_5$, $f_5$ and $e_5$ respectively shown in FIG. 4.

Under these conditions, upon completion of the opening of the metal molds of the molding machine, the motor 14 is started to begin to advance (toward left as viewed in FIG. 3) the drive shaft 38. Accordingly, the first arm 28 through fourth arm 36 as well as the chuck 37 are also moved toward left, and the second pin 30 through the fourth pin 35, chuck 37, and drive shaft 38 move along loci $b_5 \rightarrow b_1$, $c_5 \rightarrow c_1$, $d_5 \rightarrow d_1$, $f_5 \rightarrow f_1$ and $e_5 \rightarrow e_1$ respectively as shown in FIG. 4.

Near the advance limit, the speed of the motor 14 is reduced by a deceleration instruction signal generated by advance deceleration limit switch 26c thus decelerating second pin 30 through fourth pin 35, chuck 37, and drive shaft 38 beyond positions $b_1$, $c_1$, $d_1$, $f_1$ and $e_1$ shown in FIG. 4 and these members are stopped at positions $b_0$, $c_0$, $d_0$, $f_0$ and $e_0$ by a take out limit instruction signal generated by take out limit switch 26b.

In response to an insertion limit instruction signal, the molding machine 9 pushes out a product from the movable metal mold 8. This motion produces a push out limit instruction signal which causes the chuck 37 to grasp the product.

Concurrently with the commencement of the grasping operation, the motor 14 is operated to move the second pin 30 through the fourth pin 35, chuck 37 as $b_0 \rightarrow b_1$, $c_0 \rightarrow c_1$, $d_0 \rightarrow d_1$, $f_0 \rightarrow f_1$, $e_0 \rightarrow e_1$, respectively as shown in FIG. 4 whereby chuck 37 removes the product from the movable metal mold 8 and brings it to a position X shown in FIG. 3. At the same time, the take out limit switch 26b produces an instruction signal which reduces the output of the motor 14 to a value at the time of movement.

Then the second pin 30 through the fourth pin 35, chuck 37, and drive shaft 38 begin to retract (move toward right as viewed in FIG. 3).

During this retraction, the retract deceleration limit switch 26d produces a deceleration instruction signal which reduces the speed of motor 14. Consequently, the second pin 30 through the fourth pin 35, chuck 37 and the drive shaft 38 are decelerated at positions $b_4$, $c_4$, $d_4$, $f_4$ and $e_4$ respectively shown in FIG. 4 and stopped at positions $b_5$, $c_5$, $d_5$, $f_5$ and $e_5$ respectively by a take out limit instruction signal produced by take out limit switch 26b.

In response to a take out limit instruction signal, the chuck 37 begins its return operation. At the same time, the return limit switch 26f is opened to open the chuck 37 for depositing the product at a predetermined position. A predetermined time after opening the chuck, it is returned to the original position at which the return limit switch 26f is operated. Thus, the chuck 37 is positioned at position Y to prepare for the next take out operation.

In the embodiment described above the locus $f_0$–$f_5$ of the chuck 37 is depicted by the movement of the drive shaft 38 along groove 41. Thus, it will be clear that, it is possible to change the shape of the locus of the chuck 37 by modifying the shape of the groove 41.

Furthermore, it should be understood that opposing arms of the parallelogram are not limited to be strictly parallel.

As above described, since the movement of the drive shaft is magnified by the parallelogram link mechanism, the movement of the chuck can be made large. In other words, it is possible to decrease the size of the product take out device as well as the take out stroke thereof.

As above described since the locus of the chuck can be varied by varying the shape of the groove of the grooved cam plate it is possible to carry the product to any desired position which is desirable for automation. In addition, since the operation of removing the product from the metal mold and the operation of taking out the product to a discharge station are effected consecutively by a common drive source it is possible to reduce the period of operation cycle.

The invention is advantageous in that it is possible to increase the operating speed of the product take out device with increase in the operating speed of molding machines, and that the mechanism is simple and compact and can be manufactured at a low cost.

What is claimed is:

1. A product take out device for use in a molding machine, comprising a four arm link mechanism including four arms which are connected together by four pins, one of which pins is used as a stationary point of said link mechanism, a chuck operatively connected to one of said pins diagonally opposite said one pin used as a stationary point for grasping and taking out a product from a mold of said molding machine, a drive shaft provided for one of said arms, means for driving said drive shaft thereby swinging said four arm link mechanism about said stationary point, and guide means for controlling the locus of movement of said drive shaft.

2. The product take out device according to claim 1 wherein said four arm link mechanism comprises a parallelogram.

3. The product take out device according to claim 1 wherein said guide means comprises a cam plate provided with a groove, and a cam follower mounted on said drive shaft to be guided by said groove.

4. The product take out device according to claim 1 further comprising an electric motor for rotating said one pin acting as a stationary point and motion transmitting means for driving said drive shaft from said one pin.

* * * * *